(12) United States Patent
Ogawa et al.

(10) Patent No.: US 9,997,205 B2
(45) Date of Patent: Jun. 12, 2018

(54) DISC DRIVE

(71) Applicant: SHINANO KENSHI KABUSHIKI KAISHA, Nagano (JP)

(72) Inventors: Takahiro Ogawa, Nagano (JP); Akitoshi Watanabe, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 0 days. days.

(21) Appl. No.: 15/730,307

(22) Filed: Oct. 11, 2017

(65) Prior Publication Data

US 2018/0108381 A1    Apr. 19, 2018

(30) Foreign Application Priority Data

Oct. 14, 2016   (JP) .................................. 2016-202978

(51) Int. Cl.
  *G11B 17/04* (2006.01)
  *G11B 33/02* (2006.01)
  (Continued)

(52) U.S. Cl.
  CPC .......... *G11B 33/025* (2013.01); *G11B 17/043* (2013.01); *G11B 25/04* (2013.01);
  (Continued)

(58) Field of Classification Search
  None
  See application file for complete search history.

(56) References Cited

U.S. PATENT DOCUMENTS

| 4,682,320 A | * | 7/1987 | d'Alayer de Costemore d'Arc ................... G11B 17/051 720/621 |
| 5,355,358 A | * | 10/1994 | Van Alfen .......... G11B 17/0405 720/647 |

(Continued)

FOREIGN PATENT DOCUMENTS

| CN | 1601634 A | * | 3/2005 |
| JP | 61080555 A | * | 4/1986 |

(Continued)

OTHER PUBLICATIONS

Plextalk, Shinano Kenshi Co., Ltd., "http://www.plextalk.com/jp/dw_data/PTN2/PTN2UsersguideJP201303.pdf" [Online], [Searched on Oct. 4, 2016], p. 1, p. 16, and so on in Plextalk PTN2 User's Guide [Internet] <URL:http://www.plextalk.com/jp/dw_data/PTN2/PTN2UsersguideJP201303.pdf>.

(Continued)

*Primary Examiner* — William J Klimowicz
(74) *Attorney, Agent, or Firm* — Stephen J. Weyer, Esq.; Stites & Harbison, PLLC (57) ABSTRACT

A disc drive (digital book data playback apparatus) includes a cabinet, a disc insertion part through which a digital book data disc is inserted into the cabinet, the disc insertion part being provided in a surface of the cabinet, and a guide groove formed in a surface of the cabinet, the guide groove having a starting end portion formed at an opening end and a terminating end portion continued to the disc insertion part, the guide groove being capable of receiving an outer peripheral edge of the digital book data disc to be inserted into the disc insertion part until the outer peripheral edge reaches a necessary depth.

4 Claims, 6 Drawing Sheets

(51) Int. Cl.
*G11B 17/043* (2006.01)
*G11B 25/04* (2006.01)
(52) U.S. Cl.
CPC .............. *G11B 2220/2545* (2013.01); *G11B 2220/2562* (2013.01)

(56) References Cited

U.S. PATENT DOCUMENTS

| | | | | |
|---|---|---|---|---|
| 6,910,217 | B2* | 6/2005 | Kan-o | G11B 17/0404 720/646 |
| 7,496,936 | B2* | 2/2009 | Fujimura | G11B 17/0405 720/646 |
| 2009/0288106 | A1* | 11/2009 | Yokoe | G11B 17/051 720/622 |

FOREIGN PATENT DOCUMENTS

| | | | | |
|---|---|---|---|---|
| JP | 2001143353 | A | * | 5/2001 |
| JP | 2003317353 | A | * | 11/2003 |
| JP | 2005050440 | A | * | 2/2005 |
| JP | 2008084357 | A | * | 4/2008 |

OTHER PUBLICATIONS

Plextalk, Shinano Kenshi Co., Ltd., "http://www.plextalk.com/jp/dw_data/PTN2/PTN2_catalog_JP.pdf" [Online], [Searched on Oct. 4, 2016], p. 2 in Plextalk PTN2 Product Catalogue [Internet] <URL:http://www.plextalk.com/jp/dw_data/PTN2/PTN2_catalog_JP.pdf>.

* cited by examiner

DISC DRIVE

CROSS-REFERENCE TO RELATED APPLICATION

This application is based upon and claims the benefit of priority of the prior Japanese Patent Application No. 2016-202978, filed on Oct. 14, 2016, and the entire contents of which are incorporated herein by reference.

TECHNICAL FIELD

The invention relates to a disc drive used for data playback or for data playback and data recording of recording medium discs typified by CD, DVD, and BD.

BACKGROUND ART

Disc drives for data playback or for data playback and data recording of recording medium discs typified by CD, DVD, and BD are widely used in the fields of personal computers and acoustic systems. Such disc drives are mainly classified into a tray type and a slot-in type as a mounting configuration of a recording medium disc.

In the case of a tray type, a recording medium disc only needs to be placed on a concavity formed on a tray and the recording medium disc can be mounted by aligning the center hole of the recording medium disc with the spindle part.

In contrast, in the case of a slot-in type, since a disc insertion part is provided in the outer surface of the cabinet of the disc drive, at the same height as in the outer surface of the cabinet, it is very difficult to mount a recording medium disc unless the disc insertion part is visually recognized. As an example of a product adopting such a slot-in type disc drive, the applicant has proposed disc playback apparatuses for recording media (referred to below simply as "disc playback apparatuses") as disclosed in NPL 1 and NPL 2.

The disc playback apparatuses disclosed in NPL 1 and NPL 2 are provided with a projecting part for introducing a disc and the projecting part has an inclined plane continued to the disc insertion part. The user can guide a recording medium disc to the disc insertion part by sliding the recording medium disc along this projecting part.

CITATION LIST

Non Patent Literature

NPL 1: PLEXTALK, Shinano Kenshi Co., Ltd., "http://www.plextalk.com/jp/dw_data/PTN2/PTN2UsersguideJP201303.pdf" [Online], [Searched on Oct. 4, 2016], Page 1, page 16, and so on in PLEXTALK PTN2 User's Guide [Internet] <URL:http://www.plextalk.com/jp/dw_data/PTN2/PTN2UsersguideJP201303.pdf>

NPL 2: PLEXTALK, Shinano Kenshi Co., Ltd., "http://www.plextalk.com/jp/dw_data/PTN2/PTN2_catalog_JP.pdf" [Online], [Searched on Oct. 4, 2016], Page 2 in PLEXTALK PTN2 Product Catalogue [Internet] <URL:http://www.plextalk.com/jp/dw_data/PTN2/PTN2_catalog_JP.pdf>

SUMMARY OF INVENTION

Technical Problem

In a disc playback apparatus having the structure as disclosed in NPL 1 and NPL 2, if the disc playback apparatus is dropped, an impact may concentrate on the projecting part. Accordingly, the projecting part needs to have sufficient mechanical strength (impact resistance). Therefore, the projecting part needs to be made of a material having high mechanical strength as in the cabinet part and this prevents reduction in the manufacturing cost of the disc playback apparatus. In addition, since a part of the outer surface of the cabinet part projects, reduction in the sizes of the disc drive and the disc playback apparatus is also prevented.

Solution to Problem

Accordingly, an object of the invention is to provide a disc drive in which a disc can be easily mounted to the disc insertion part even when the disc insertion part is not visually recognized and the production cost and the size can be reduced.

As a result of earnest study made by the inventor to solve the above problems, the following structure has been obtained. That is, according to the invention, there is provided a disc drive including a cabinet, a disc insertion part through which a recording medium disc is inserted into the cabinet, the disc insertion part being provided in a surface of the cabinet, and a guide groove formed in a surface of the cabinet, the guide groove having a starting end portion formed at an opening end and a terminating end portion continued to the disc insertion part, the guide groove being capable of receiving an outer peripheral edge of the recording medium disc to be inserted into the disc insertion part until the outer peripheral edge reaches a necessary depth.

This enables the user to insert the recording medium disc into the disc insertion part only by sliding the recording medium disc along the guide groove in the state in which the outer peripheral edge of the recording medium disc is inserted into the guide groove so as to reach a necessary depth. In addition, since there is no projection outside the cabinet, an impact does not concentrate if the disc drive is dropped, the cabinet of the disc drive can be made of an inexpensive material, and the size can be reduced.

In addition, preferably, the starting end portion is disposed at a corner of the cabinet.

This enables the user to easily grasp the position of the starting end portion of the guide groove.

In addition, preferably, a width of the guide groove is gradually reduced from the starting end portion to the terminating end portion.

This enables the recording medium disc to be inserted into the guide groove easily and the recording medium disc to be guided to the disc insertion part accurately.

In addition, preferably, of first and second opening edges in a depth direction of the guide groove, the first opening edge facing a recording surface of the recording medium disc undergoes round machining and the second opening edge facing a non-recording surface of the recording medium disc undergoes edge machining. In addition, preferably, at least the guide groove is made of a material softer than a material of the recording medium disc. In addition, preferably, a depth of the guide groove is up to 2 millimeters.

This prevents the recording surface of the recording medium disc from being scratched at the maximum even when use in the state in which the recording medium disc is inserted into the guide groove is repeated.

Advantageous Effects of Invention

By adopting the structure of the disc drive according to the invention, even in the state in which the disc insertion part is not visually recognized, a disc can be easily mounted to the disc insertion part. In addition, since the cabinet of the disc drive has no projection, the size of the disc drive can be reduced.

DESCRIPTION OF EMBODIMENTS

A digital book data playback apparatus for vision-impaired persons will be described below as a disc drive according to an embodiment of the invention.

Figure 6:
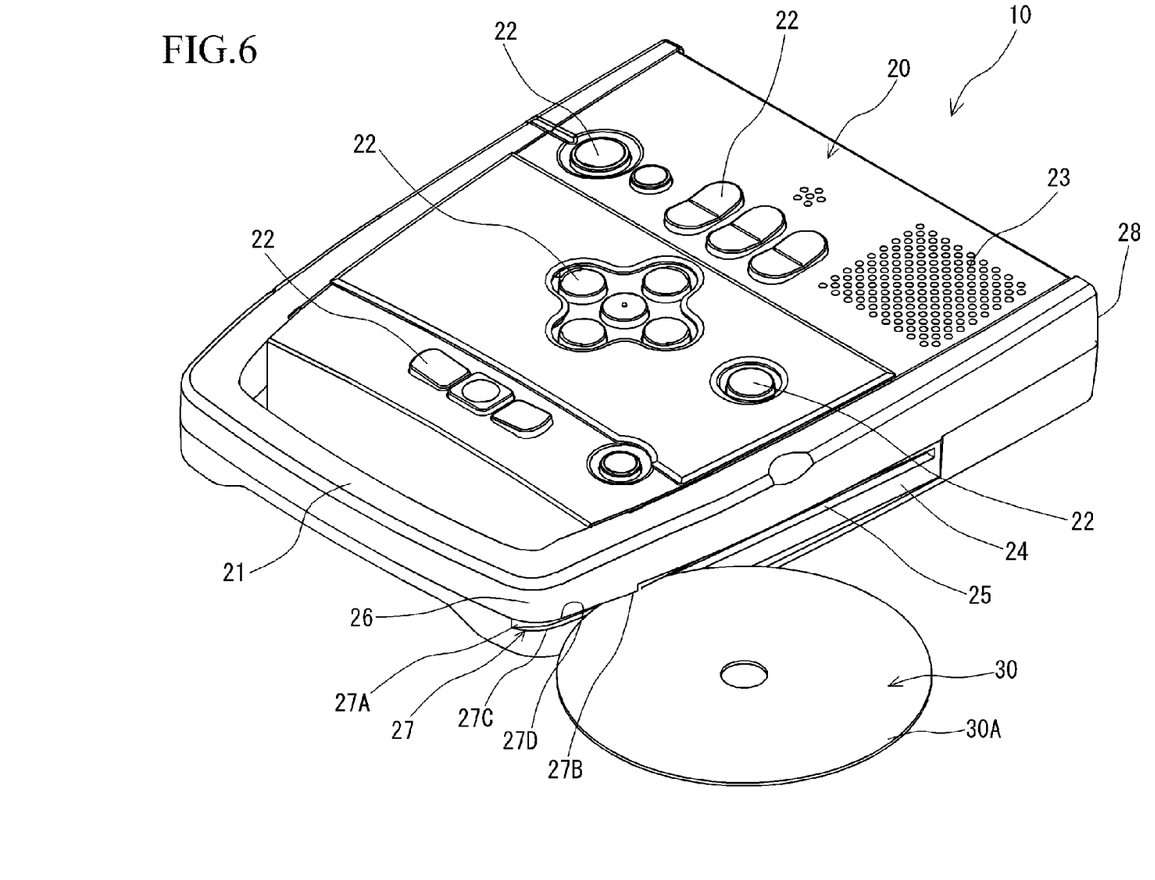
FIG. 6 is a perspective view illustrating the disc drive in an example in which the disc drive is used.

A digital book data playback apparatus 10 according to the embodiment is used to play a digital book data disc 30, which is a recording medium disc. The digital book data playback apparatus 10 has a cabinet 20 formed in a flat trapezoidal column with which a handle 21 is integrated, as illustrated in FIGS. 1 to 4. Operation buttons 22 for operating the digital book data playback apparatus 10 and a speaker 23 are provided on the upper surface of the cabinet 20. The operation buttons 22 are disposed in a plurality of positions on the upper surface of the cabinet 20 in the state in which the operation buttons 22 are grouped by the operation type. In addition, a disc insertion part 25 is provided on the right side surface of the cabinet 20. The disc insertion part 25 is opened to the right side surface of the cabinet 20 and used to insert the digital book data disc 30 (see FIG. 6) into (into the cabinet 20) a slot-in type disc drive mechanism 24. It should be noted that the speaker 23 and the disc drive mechanism 24 are not described in detail here because they have known structures.

A starting end portion 27A of a guide groove 27 is provided at a corner 26 (referred to below simply as the corner 26) of the handle 21 at which the right surface of the cabinet 20 intersects the front surface of the cabinet 20. The starting end portion 27A of the guide groove 27 is formed at the opening end opened to the front surface of the cabinet 20. In addition, the guide groove 27 is opened to a surface (right side surface in this case) of the cabinet 20, formed in a recessed groove into which an outer peripheral edge 30A of the digital book data disc 30 can be inserted until the outer peripheral edge 30A reaches a necessary depth, and provided in the state in which a terminating end portion 27B is continued to the disc insertion part 25. As is apparent from FIG. 3, at least one end edge (opening edge 27C in this case) of the guide groove 27 extends linearly from the starting end portion 27A to the terminating end portion 27B.

Figure 1:
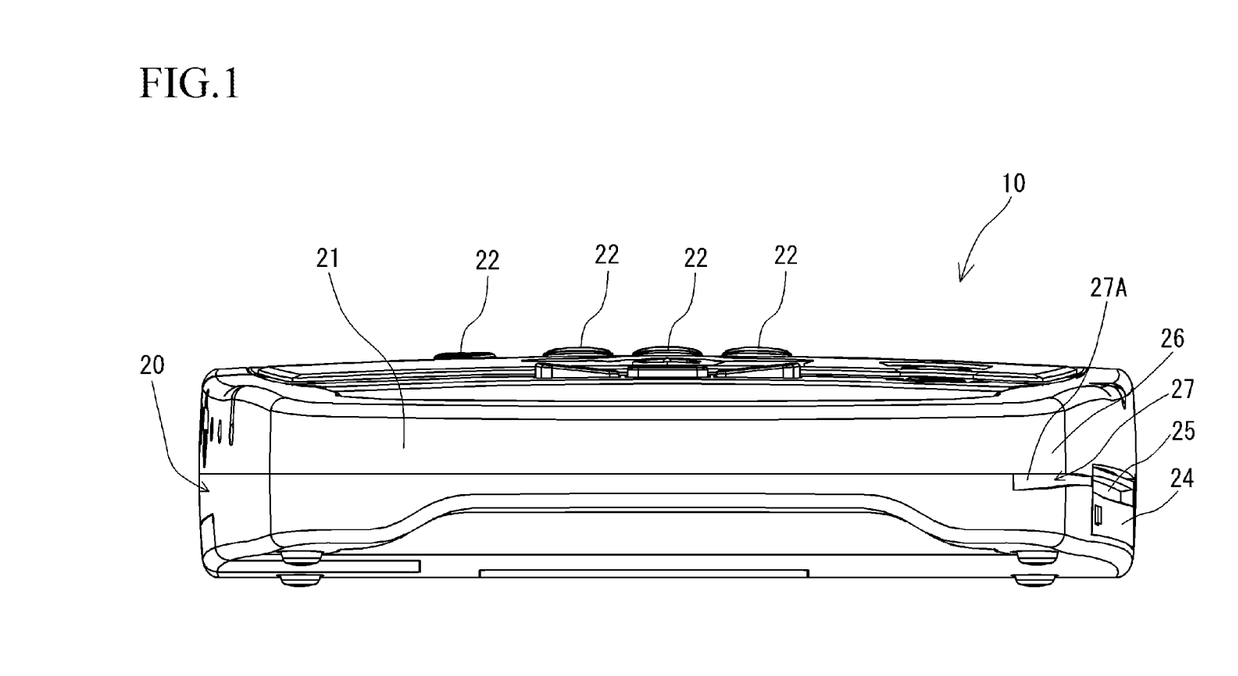
FIG. 1 is a front view illustrating a disc drive according to an embodiment.
Figure 2:
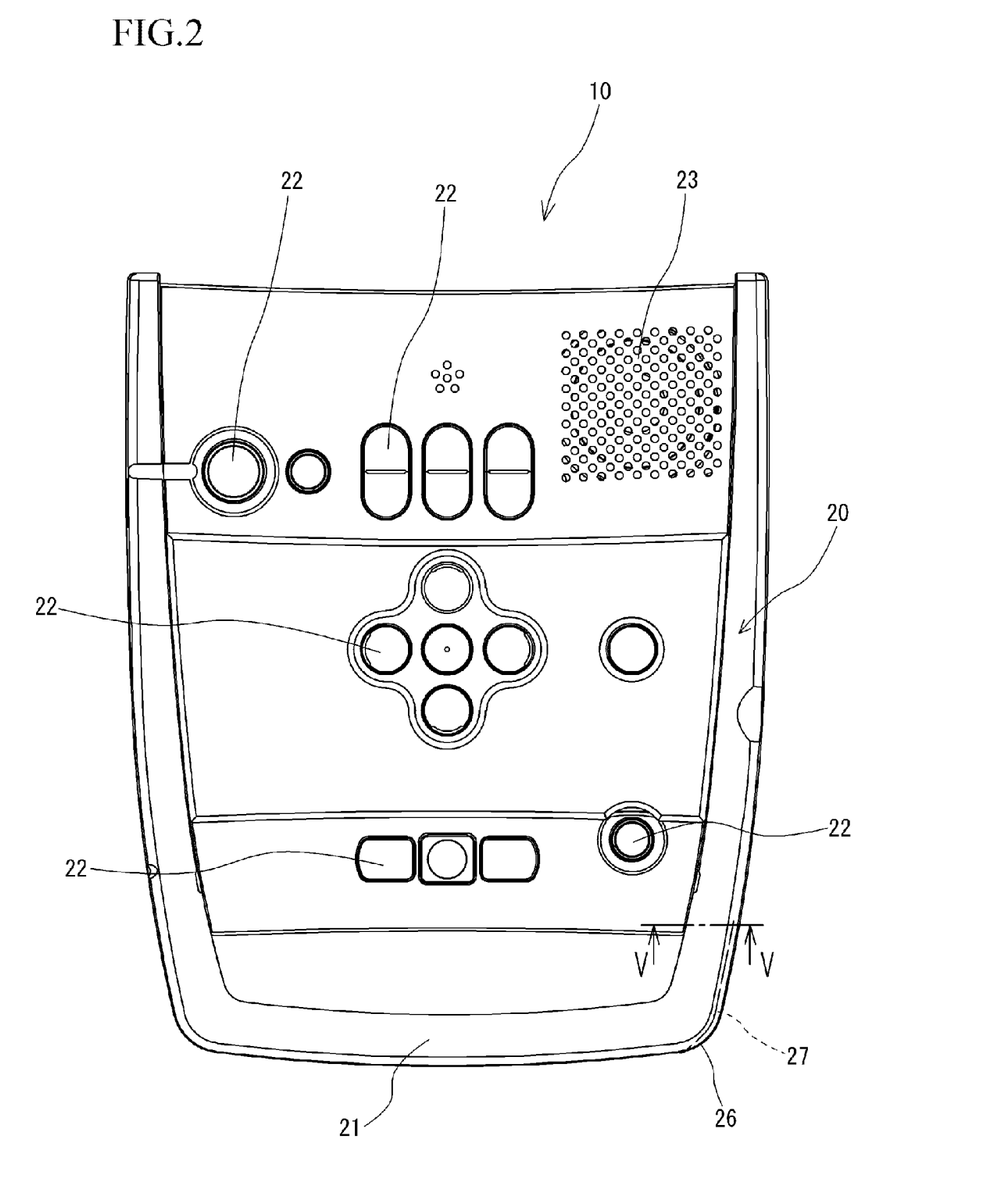
FIG. 2 is a plan view illustrating the disc drive according to the embodiment.
Figure 3:
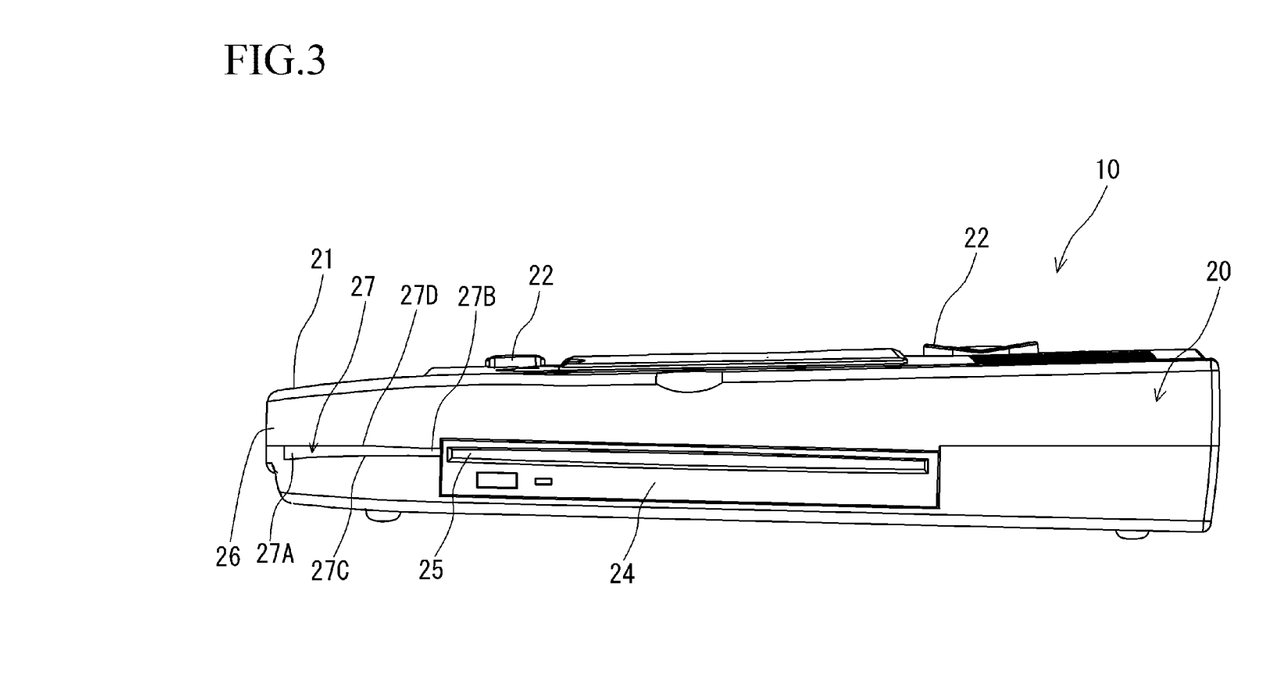
FIG. 3 is a right side view illustrating the disc drive according to the embodiment.
Figure 4:
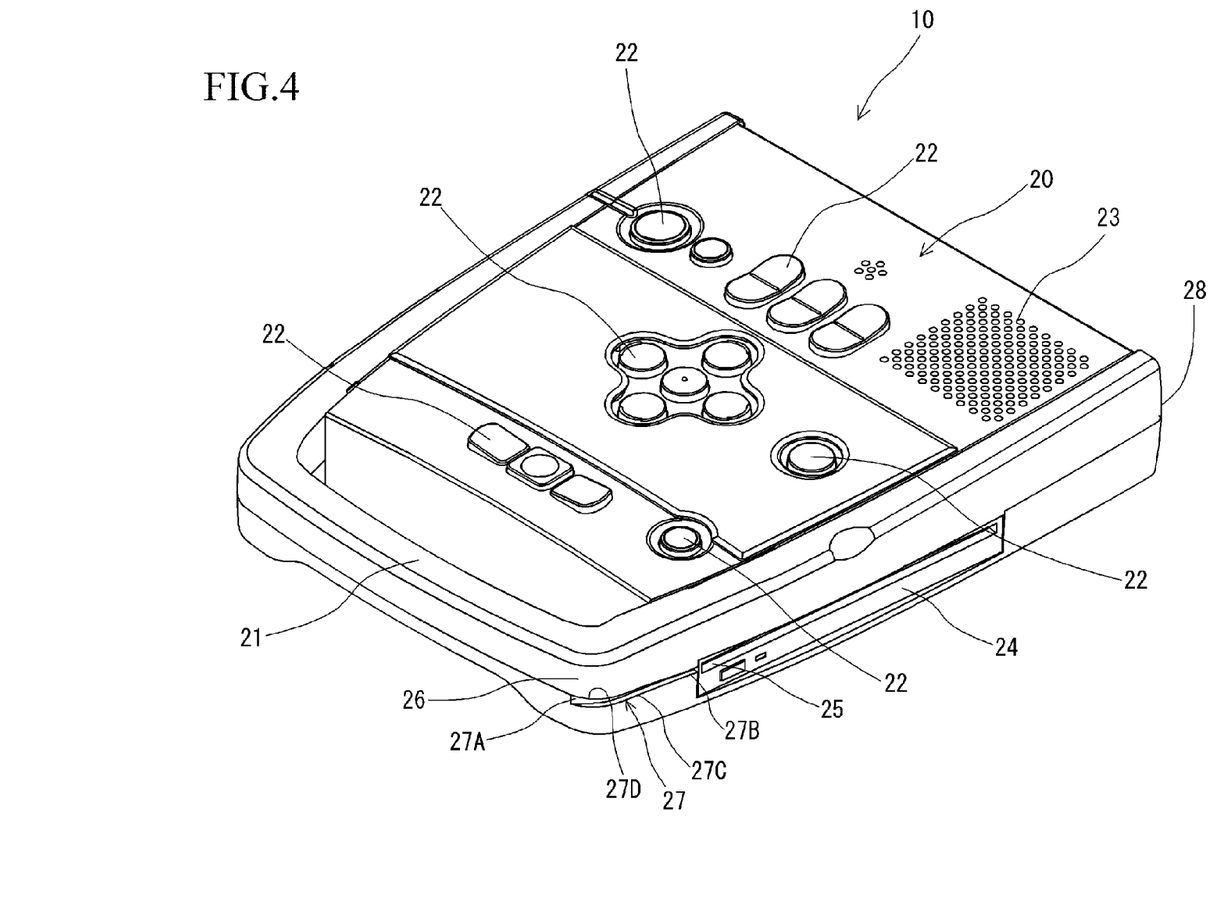
FIG. 4 is a perspective view illustrating the disc drive according to the embodiment.

In addition, as is also apparent from FIGS. 3 and 4, the width of the guide groove 27 is gradually reduced from the starting end portion 27A to the terminating end portion 27B. Since the guide groove 27 has such a structure, the digital book data disc 30 can be easily aligned with the guide groove 27 and can be surely guided to the disc insertion part 25. Accordingly, the digital book data playback apparatus 10 is very accessible particularly to vision-impaired persons.

Figure 5:
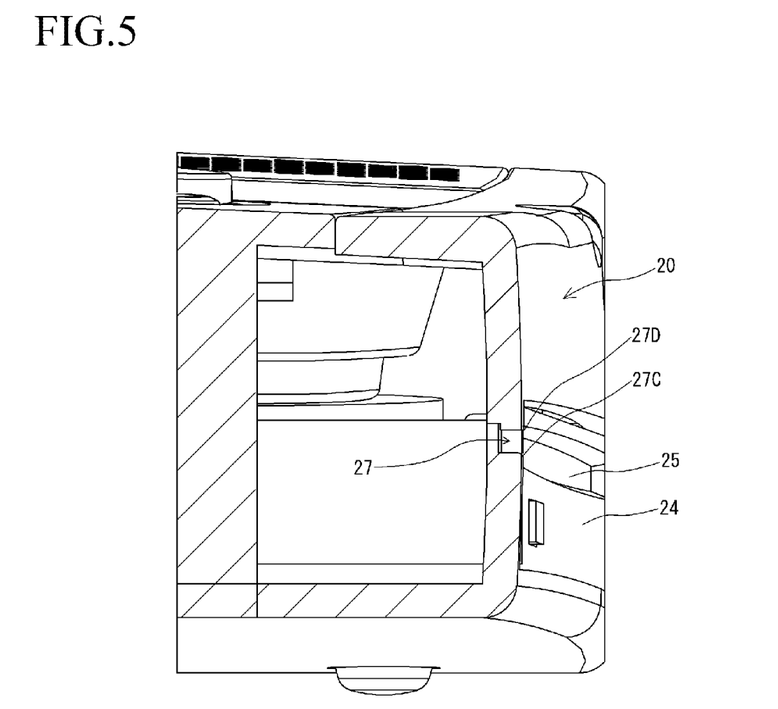
FIG. 5 is an enlarged cross sectional view illustrating a guide groove portion taken along line V-V in FIG. 1.

Specifically, the width of the starting end portion 27A of the guide groove 27 is 3.5 mm (three times as large as the thickness of the digital book data disc 30), the width of the terminating end portion 27B of the guide groove 27 is 2 mm, and the depth of the guide groove 27 is a constant value of 2 mm (2 mm at the maximum) (see FIG. 5). Accordingly, the insertion depth when the outer peripheral edge 30A of the digital book data disc 30 is inserted into the guide groove 27 can be obtained sufficiently and the outer peripheral edge 30A of the digital book data disc 30 can be slid without deviating from the guide groove 27. In addition, the overlapping part between the recording surface and the guide groove 27 when the digital book data disc 30 is inserted into the guide groove 27 can be suppressed to 1 mm or less. Accordingly, the risk of occurrence of a data read error in the digital book data disc 30 can be reduced.

In addition, of the opening edge 27C and an opening edge 27D in the depth direction (on the right side surface of the cabinet 20) of the guide groove 27, the opening edge 27C facing the data recording surface of the digital book data disc 30 is formed in a round shape having undergone so-called round machining. In addition, the opening edge 27C is formed in a curve gently bent with respect to the extension direction. In contrast, the opening edge 27D facing the data non-recording surface of the digital book data disc 30 has undergone edge machining and is formed in a straight line parallel to the installation surface (horizontal surface) of the digital book data playback apparatus 10.

This enables the digital book data disc 30 to be easily inserted into the guide groove 27, the non-recording surface to be easily slid in the guide groove 27 by sliding the digital book data disc 30 along the guide groove 27, and the digital book data disc 30 to be linearly guided by the disc insertion part 25. In addition, even if the recording surface of the digital book data disc 30 slides on the guide groove 27, the recording surface can be prevented from being scratched by the opening edge 27C.

As described above, by adopting the structure of the digital book data playback apparatus 10 according to the embodiment, even a blind (vision-impaired) user can insert the digital book data disc 30 into the disc insertion part 25 easily and surely. Accordingly, it is possible to significantly improve the ease of use when a so-called vision-impaired person uses the digital book data disc 30.

Although the structure of the disc drive according to the invention has been described above in detail based on the digital book data playback apparatus 10 according to the embodiment, the technical scope of the invention is not limited to the embodiment. For example, although the digital book data playback apparatus 10 has been described in the embodiment, the invention is applicable to an audiovisual disc drive, a data disc drive, and the like in addition to the digital book data playback and recording apparatus.

In addition, although the digital book data playback apparatus 10 having the so-called slot-in type disc insertion part 25 has been described in the embodiment, it is also possible to adopt the structure of the digital book data playback apparatus 10 (disc drive) having the so-called tray type disc insertion part 25. When the tray type disc insertion part 25 is adopted, the guide groove 27 only needs to be provided in a position higher than the plane on which the digital book data disc 30 is placed.

In addition, although the guide groove 27 is provided on only one side in the width direction of the disc insertion part 25 in the embodiment, the guide groove 27 may be provided on both sides in the width direction of the disc insertion part 25. More specifically, it is also possible to adopt a mode in which the guide groove 27 continued from a corner 28 illustrated in FIGS. 4 and 6 to the disc insertion part 25 has been additionally provided in addition to the guide groove 27 in the embodiment.

In addition, although the width of the guide groove 27 is gradually reduced from the starting end portion 27A to the terminating end portion 27B, the width of the guide groove 27 may be constant. In addition, the depth of the guide groove 27 may be gradually reduced from the starting end portion 27A to the terminating end portion 27B.

In addition, the guide groove 27 may be formed in another member, separated from the cabinet 20, that is attachable to and detachable from the cabinet 20. The other member (part of the guide groove 27) in which the guide groove 27 is formed is preferably made of a material softer than the material of the cabinet 20. Specifically, the other member is preferably made of synthetic rubber or an elastomer material. Since such synthetic rubber or an elastomer material described above is softer than polycarbonate included in the digital book data disc 30 as well as the material of the cabinet 20, the recording surface of the digital book data disc 30 can be surely prevented from being damaged due to contact with the guide groove 27.

In addition, the modes described in the above embodiment may be combined with the above modifications as appropriate.

What is claimed is:

1. A disc drive comprising:
   a cabinet;
   a disc insertion part through which a recording medium disc is inserted into the cabinet, the disc insertion part being provided in a surface of the cabinet; and
   a guide groove formed in a surface of the cabinet, the guide groove having a starting end portion formed at an opening end disposed at a corner of the cabinet, and a terminating end portion continued to the disc insertion part, wherein a width of the guide groove is gradually reduced from the starting end portion to the terminating end portion, the guide groove being capable of receiving an outer peripheral edge of the recording medium disc to be inserted into the disc insertion part until the outer peripheral edge reaches a necessary depth.

2. The disc drive according to claim 1,
   wherein, of first and second opening edges in a depth direction of the guide groove, the first opening edge facing a recording surface of the recording medium disc undergoes round machining and the second opening edge facing a non-recording surface of the recording medium disc undergoes edge machining.

3. The disc drive according to claim 1,
   wherein at least the guide groove is made of a material softer than a material of the recording medium disc.

4. The disc drive according to claim 1,
   wherein a depth of the guide groove is up to 2 millimeters.

* * * * *